(12) United States Patent
Hayashi et al.

(10) Patent No.: US 7,281,763 B1
(45) Date of Patent: Oct. 16, 2007

(54) AUTOMOTIVE SEAT FOR MOUNTING CHILD SEAT THEREON

(75) Inventors: Satoshi Hayashi, Raymond, OH (US); Ken Pilcher, Raymond, OH (US); Spyro G. Blatseas, Raymond, OH (US); Hiroyuki Fujii, Farmington Hills, MI (US); Toshinari Mitsumoto, Farmington Hills, MI (US)

(73) Assignees: Honda Motor Co., Ltd., Tokyo (JP); Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/476,663

(22) Filed: Jun. 29, 2006

(51) Int. Cl.
*A47D 1/10* (2006.01)
(52) U.S. Cl. .................................................. 297/253
(58) Field of Classification Search ................ 297/253, 297/238, 411.32, 230.1, 232, 233, 248, 452.18, 297/250.1
See application file for complete search history.

(56) References Cited

U.S. PATENT DOCUMENTS 6,375,260 B1 * 4/2002 Hiramatsu et al. ..... 297/256.16
6,478,376 B2 * 11/2002 Hayashi et al. .......... 297/250.1
6,601,917 B1 * 8/2003 Christopherson ........... 297/253
6,827,400 B2 * 12/2004 Menon et al. ........... 297/250.1

FOREIGN PATENT DOCUMENTS

JP          2001-277920          10/2001

* cited by examiner

*Primary Examiner*—Milton Nelson, Jr.
(74) *Attorney, Agent, or Firm*—Browdy and Neimark, PLLC

(57) ABSTRACT

An automotive seat of the type allowing a child seat to be mounted thereon and including a center back portion, wherein a shape-retaining/locking element is provided to a lower region of the center back portion. The shape-retaining/locking element includes a rigid hollow support body; a cut-away portion defined in the support body; a female engagement element to which the child seat is lockably engaged, the female engagement element being exposed outwardly in such cut-away portion; and a cover element for covering the hollow support body and cut-away portion. The cover element includes a layer of hard synthetic resin material with a certain elasticity, such that it normally tends to retain its original shape generally conforming to a forwardly facing surface portion hollow support body. One end of the cover element may be releasably connected to the lower region of the hollow support body.

13 Claims, 3 Drawing Sheets

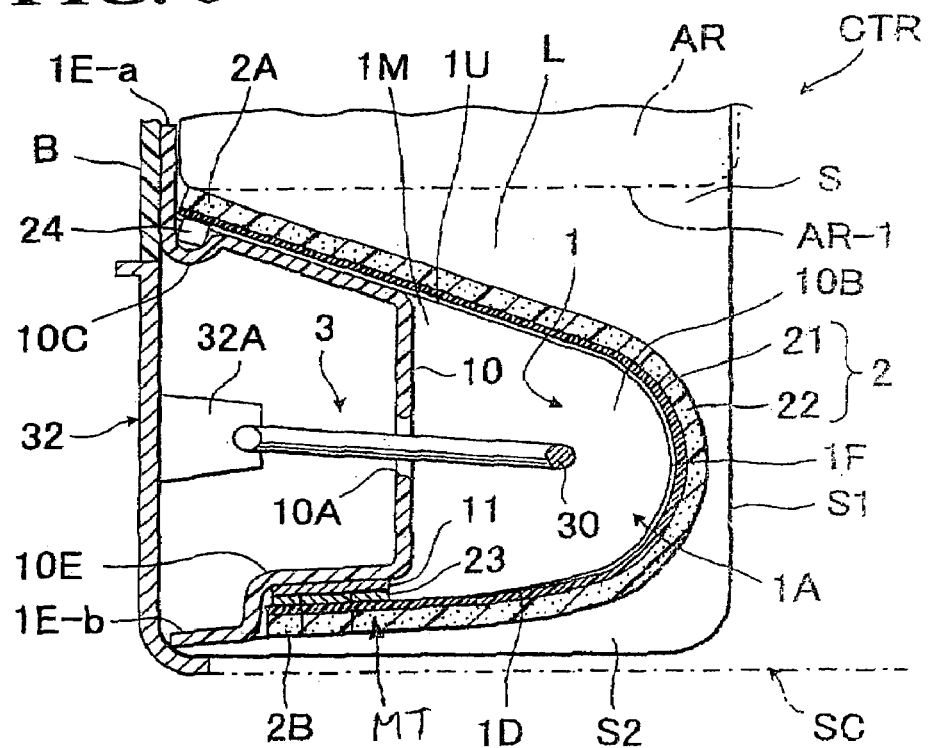
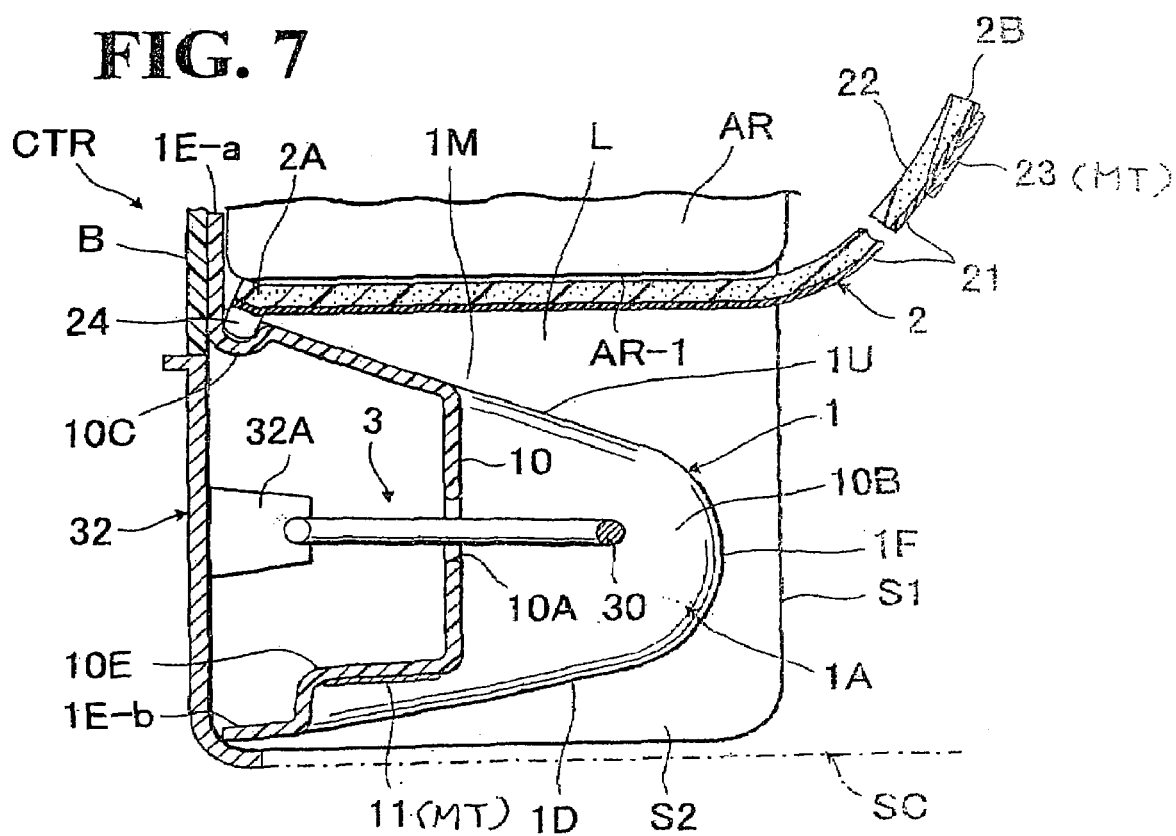

AUTOMOTIVE SEAT FOR MOUNTING CHILD SEAT THEREON

BACKGROUND OF THE INVENTION

1. Field of the Invention

The present invention relates to an automotive seat which allows a child seat to be securely mounted thereon. More specifically, the invention is directed to an automotive seat of the type having a pair of seat back portions and a center back portion defined therebetween, which provides a shape retaining effect in a lower region of the center back portion and also allows a child seat to be lockably connected with that lower region of center back portion.

2. Description of Prior Art

As shown in FIG. 1, there has been known a rear seat for use in an automobile, which is of the type including a pair of seat back portions (SB) (SB) and a center back portion (CTR) defined between the two seat back portions (SB) (SB), wherein an armrest (AR) is rotatably provided to that center back portion (CTR). Designation (SC) denotes a seat cushion.

As can be seen in FIG. 2, the armrest (AR) is rotatably connected at its lower end portion with the center back portion (CTR) so as to be displaceable between a storage position at the center back portion (CTR) and a use position at the seat cushion (SC), as indicated by the arrow. That is, normally, as indicated by the solid line in FIGS. 1 and 2, the armrest (AR) is set at the storage position where it rests vertically on a back board (B) of the center back portion (CTR) in a non-use sate. But, as indicated by the one-dot chain lines in FIG. 2, the armrest (AR) may be set at the use position where it rests horizontally on an upper surface of the seat cushion (SC) to thereby receive and support an arm of an occupant sitting on the seat.

In this sort of automotive seat, a space, indicated by designation (L), is given between the lower end (AR-1) of the armrest (AR) set at the aforesaid storage position and the upper surface of the seat cushion (SC). As is known, the space (L) is designed to accommodate therein a shaft (at 50) and frame elements which are associated with the armrest (AR) and is particularly designed to allow the shaft to be provided therein and extended between a pair of brackets, so that the armrest (AR) is free to rotate about the shaft between the afore-stated storage and use positions.

However, as shown in FIG. 2, this space (L) is very small because its height (H) is minimized to only allow rotation of the armrest (AR) and its depth (W) is limited by the thickness of the armrest (AR).

Such small size of space (L) can not be covered decoratively with a foam padding and the like in aesthetic fashion, because the foam padding should inevitably have a small thickness and therefore the foam padding is easy to deform into an objectionable shape.

And also, it has been considered impossible to use the small space (L) as a connection point to which a child seat of ISO standard type or the like is lockably connected.

The -ISO-standard-type child seat is designated by (C) in FIG. 2 and provided with a pair of rearward notch portions (43) and a pair of hook-like latch pieces (42), which are all formed in accordance with a standard of ISO (International Standardization Organization).

Conventionally, the Japanese Patent No. 3462142 discloses an automotive rear seat of the above-described type having two seat backs and a center back portion, and teaches a particular formation of seat cushion of the seat which enables lockable connection with the foregoing female engagement portions of child seat. According thereto, a backward end portion of seat cushion of the seat is formed with an upwardly protuberant portion which is disposed beneath the lower end of seat back and has a pair of through-holes defined therein. This upwardly protuberant portion is an upward extension of a foam padding used in the seat cushion and covered with a trim cover assembly. The pair of through-holes, formed in that upwardly protuberant portion, are adapted for allowing insertion thereinto of the respective two rearward notch portions as well as the respective two hook-like latch pieces of ISO-standard child seat. In each of those two through-holes, an engagement wire element is provided, so that each hook-like latch piece of the child seat may be engaged over each engagement wire element, thereby securing the child seat to either of the two seat backs.

But, even the Japanese prior art has no disclosure about engagement of the child seat with the center back portion, and there is no prior technical solution thereon.

SUMMARY OF THE INVENTION

In view of the above drawbacks, it is therefore a purpose of the present invention to provide an automotive seat of the type having a center back portion, which allows a child seat to be lockably connected with the center back portion, while providing a shape retaining effect to that center back portion.

In order to achieve such purpose, in accordance with the present invention, there is basically provided an automotive seat of the type which allows a child seat to be mounted thereon and has a pair of seat backs, a center back portion defined between the pair of seat backs, and a seat cushion, wherein the center back portion has a lower region adjacent to the seat cushion and the child seat includes a male lock means, the automotive seat comprising:
a shape-retaining locking element provided to the lower region of the center back portion, the shape-retaining/locking element comprising;
a hollow support body formed from a rigid material, the hollow support body having: a forwardly facing surface portion which faces to a forward side of the automotive seat; a lower region facing to the seat cushion; and an upper region opposite to the lower region;
a cut-away portion defined in a local part of the forwardly facing surface portion of the hollow support body;
a female engagement means fixedly provided in the hollow support body, such that a part thereof is exposed outwardly in the cut-away portion, wherein the part of the female engagement means is so adapted that the male lock means of the child seat is engageable therewith for locking the child seat to the center back portion; and
a cover means for covering the forwardly facing surface portion of the hollow support body and the cut-away portion, the cover means comprising at least two cover layers, wherein one of the at least two cover layers is formed from a relatively hard synthetic resin material with a certain elasticity so as to normally tend to retain an original shape due to a resilient recovery force thereof, while being bendable with a force overcoming the resilient recovery force, wherein the said original shape is a shape generally conforming to the forwardly facing surface portion of the hollow support body, wherein the cover means is securely connected at one end thereof with the upper region of the hollow support body and is releasably connected at another end thereof with the lower region of the hollow support body, such that the foregoing one of the at least two cover layer is in contact with and along the forwardly facing surface portion of the hollow support body, while extending over the cut-away portion.

Accordingly, the forwardly facing surface portion of the hollow support body effectively profides a rigid and undeformable surface sufficient to support a lower body portion of a seat occupant and withstand keen contact of the child seat therewith as well as a load applied from the child seat locked to the shape-retaining/lock element. Further, the cover means, by the reason that it includes the aforesaid one layer of the synthetic resin materil, serves to positively retain a given shape conforming to the shape of the forwardly facing surface portion of the hollow support body and cover the cut-away portion, thus providing an aesthetically improved appearance of the shape-retaining/locking element. Furthermore, the child seat can be easily locked to the center back portion.

Preferably, the male lock means of the child seat may be formed under ISO standard, and so formed may be the female engagement means.

As one aspect of the present invention, the forwardly facing surface portion of the hollow support body may be of a generally "U" shape in a longitudinal section, which comprises a lower wall region facing to the seat cushion, an upper wall region opposite to the lower wall region, a forward curved wall region defined between the lower and upper wall regions, the forward curved wall region facing to the forward side, and wherein the one of the at least two cover layers is formed in a curved shape that generally conforms to the generally "U" shape of the hollow support body and has a resilient recovery force that normally tends to retain the curved shape and thus cover the lower and upper wall regions as well as the forward curved wall region in conformity therewith, while being bendable reversely away therefrom with a force overcoming the resilient recovery force.

Preferably, the lower wall region may be sloped upwardly away from the seat cushion as it proceeds to the forward curved wall region, thereby allowing easy insertion of user's hands into a space between the hollow support body and seat cushion in order to withdraw and insert the foregoing another end of the cover means from and into a securing point.

As another aspect of the present invention, an armrest may be provided to the center back portion, so that the shape-retaining/locking element is disposed under the armrest at the lower region of the center back portion. Of course, the forwardly facing surface portion of hollow support body may be of a generally "U" shape in longitudinal section as described above, in which case, the lower wall region may be sloped upwardly away from the seat cushion as it proceeds to the forward curved wall region, whereas the upper wall region be sloped downwardly away from the armrest as it proceeds to the forward curved wall region.

Other various features and advantages of the present invention will become apparent from reading of the description, hereinafter, with reference to the annexed drawings.

BRIEF DESCRIPTION OF THE DRAWINGS

FIG. 6 is a sectional view taken along the line VI-VI in the FIG. 5; and

FIG. 7 is a sectional view showing the state where the shape-retaining cover member is warped upwardly to expose the cut-away portion and engagement wire element.

DETAILED DESCRIPTION OF PREFERRED EMBODIMENT OF THE INVENTION

Referring to FIGS. 1 to 7, there is illustrated a preferred mode of automotive seat of the type allowing a child seat to be mounted thereon in accordance with the present invention.

Figure 1:
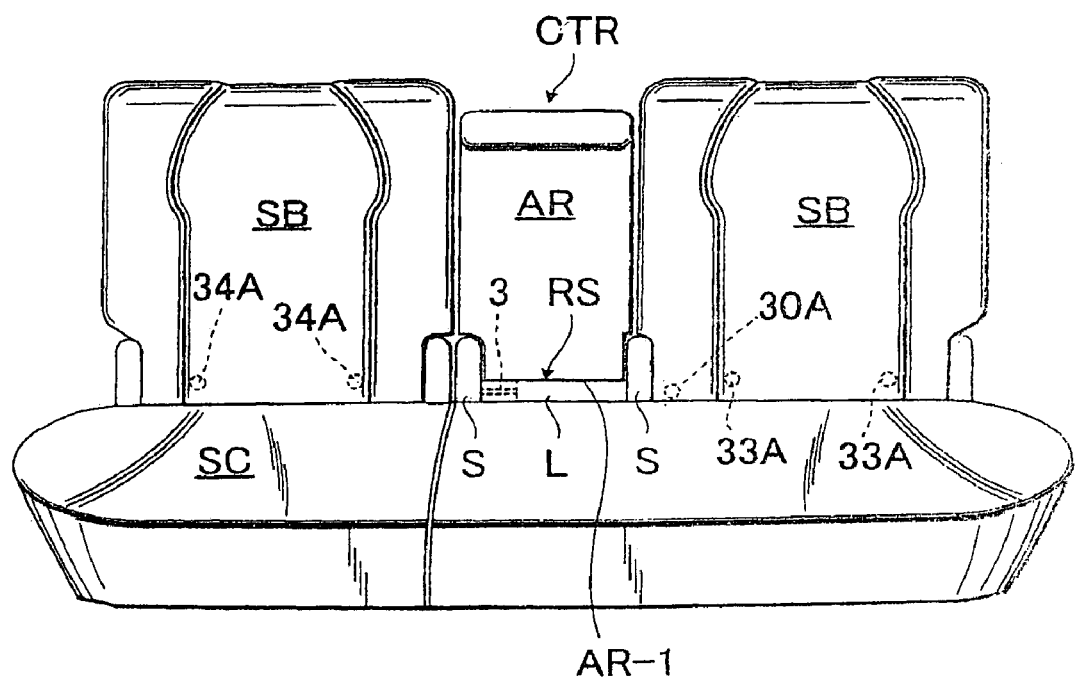
FIG. 1 is a schematic front view of a seat of the type allowing a child seat to be mounted thereon and having a center back portion between two seat backs in accordance with the present invention.

FIG. 1 shows a seat for use in an automobile, which is of the type including a pair of seat back portions (SB) (SB) and a center back portion (CTR) defined between the two seat back portions (SB) (SB), wherein an armrest (AR) is rotatably provided to the center back portion (CTR). These seat elements (SB, CTR and AR) are provided on a backward end portion of seat cushion (SC) as shown.

It is noted that, hereinafter, the wording, "frontal", "forward" or "forwardly", refers to a direction toward a forward side (F) of the seat, whereas the wording, "backward" or "backwardly, refers to a direction toward a backward side (R) of the seat.

Figure 3:
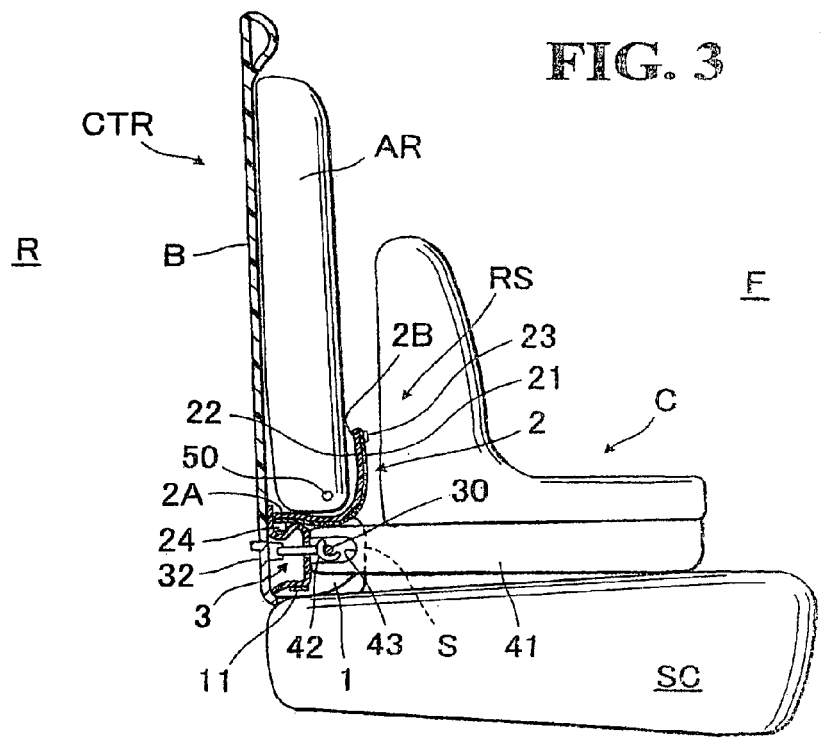
FIG. 3 is a side elevational view partly in section, which shows the state where the child seat is mounted on the seat and locked to a shape-retaining/locking element in accordance with the present invention.
Figure 4:
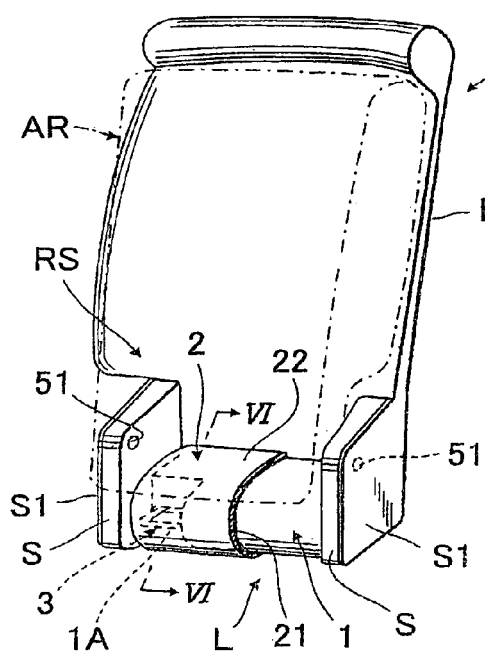
FIG. 4 is a partly broken perspective view of the center back portion to which the shape-retaining/locking element is provided.

The center back portion (CTR) itself is known in the art, and as best seen in FIG. 4, it comprises a back board (B) and a pair of spaced-apart brackets (S) (S) disposed at the lower end of the back board (B). The two brackets (S) are fixedly connected with a frame member (32) integrally fixed to the lower end of the back board (B), as seen from FIG. 3. The back board (B) extends vertically from the brackets (S) and frame member (32) in parallel with the two seat backs (SB).

A shaft (50) extends through the lower end region of the armrest (AR) so that two end portions of the shaft (50) project outwardly therefrom.

Figure 2:
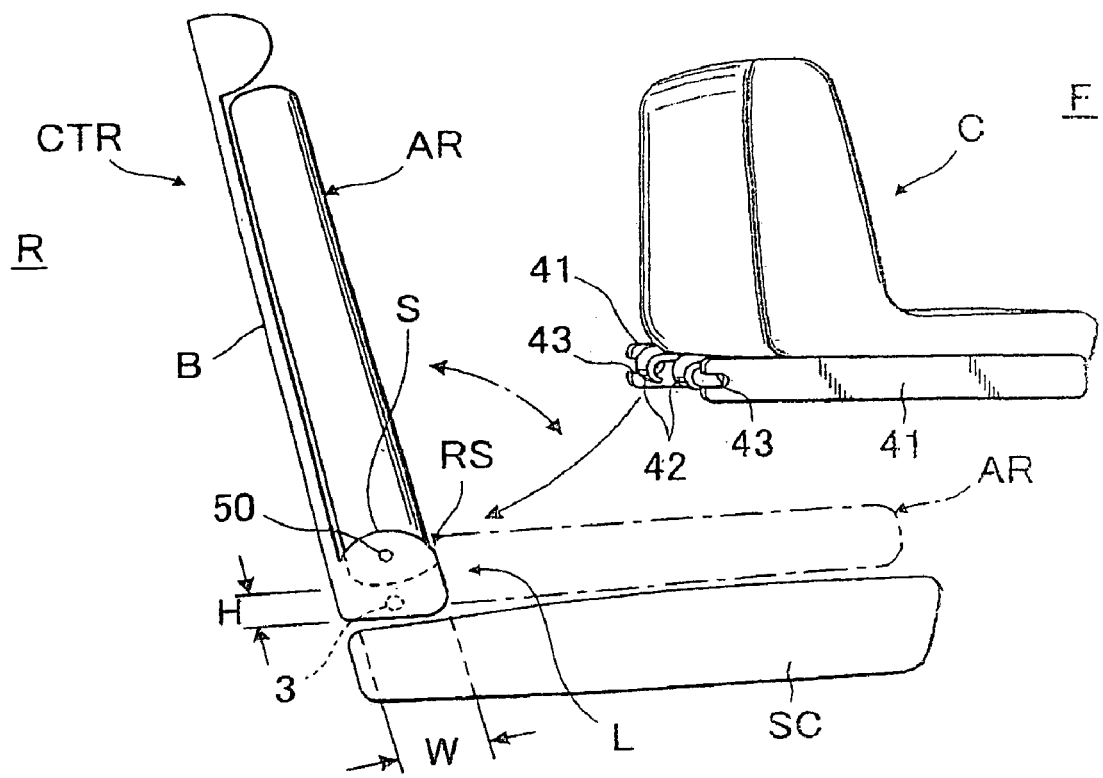
FIG. 2 is a diagram which explanatorily shows how the child seat is locked to the center back portion.

A bearing hole (51) is formed in each of the foregoing two brackets (S) so as to be disposed at an upper end region of the bracket (S). Thus, though not clearly shown, the two end portions of shaft (50) are rotatably fitted in the respective two holes (51) (51). Namely, the lower end portion of the armrest (AR) is rotatably journalled between the two brackets (S) via the two end portions of the shaft (50), with a small space (L) being naturally given under the lower end (AR-1) of armrest (AR) as previously stated in the description of prior art. Hence, as can be seen in FIG. 2, the armrest (AR) is displaceable relative to the shaft (50) between a storage position at the center back portion (CTR) and a use position at the seat cushion (SC), as indicated by the arrow. More specifically, as indicated by the solid line in FIGS. 1 and 2, the armrest (AR) may be set of the storage position where it rests on the back board (B), which is a non-use state of the armrest (AR). On the other hand, as indicated by the one-dot chain lines in FIG. 2, the armrest (AR) may be rotated down from the storage position to a use position where it rests horizontally on an upper surface of the seat cushion (SC).

Designation (S1) stands for a resin cover which is fixedly attached to outer lateral surface of each of the foregoing brackets (S), thereby concealing the bearing hole (51) and improving outer appearance of both two brackets (S)

Designation (C) denotes a child seat of ISO standard. As shown in FIG. 2, this child seat (C) has a pair of lower base frames (41)(41), each being at its rearmost end provided with an engagement notch portion (43) which is formed under the standard of ISO (International Standardization Organization). Also, the child seat (C) includes: a hook-like latch piece (42) formed under ISO standard; and a locking mechanism (not shown) for causing movement of the latch piece (42) for a locking and unlocking purpose to be described later.

In accordance with the present invention, there is provided a shape-retaining/locking element (RS) in the above-mentioned small space (L) under the armrest (AR) at the center back portion (CTR) in order to not only provide a support wall which fills that small space (L), while retaining a predetermined shape of that wall, but also permit engagement therewith of the foregoing ISO-standard lock elements of child seat (C), i.e. the engagement notch portion (43) and latch piece (42).

Reference is particularly made to FIGS. 4 to 7. Generically stated, the shape-retaining/locking element (RS) essentially consists of: a rigid hollow support body (1) having a main hollow body portion (1M) and a cut-away portion (1A) defined in one corner region of the main hollow body portion (1M); a generally U-shaped engagement wire element (3) of ISO standard fixedly disposed in the cut-away portion (1A), which is so adapted that the ISO-standard latch piece (42) is engageable therewith; and a shape-retaining cover member (2) for covering an entirety of those main hollow body portion (1M) and cut-away portion (1A).

Figure 5:
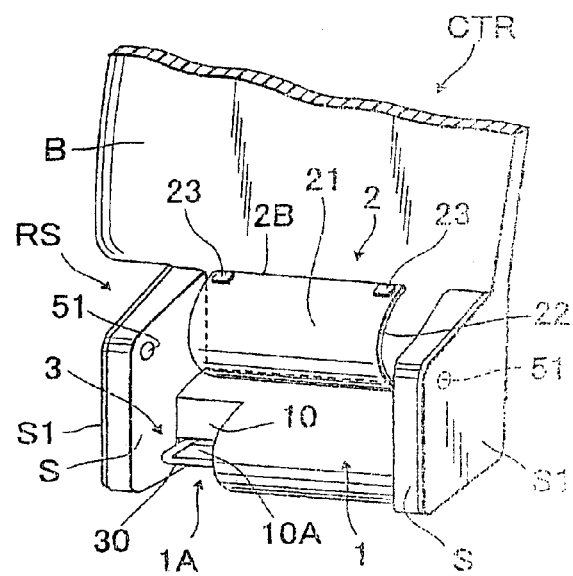
FIG. 5 is a perspective view partly in section of the center back portion, which shows the state where a shape-retaining cover member is warped upwardly to expose a cut-away portion and an engagement wire element.

More specifically, the hollow support body (1) per se is formed from a hard synthetic resin material, such as polypropylene, and, as best seen in FIGS. 5 and 7, the illustrated main hollow body potion (1M) thereof is so formed to have a curved outer configuration of generally "U" shape in longitudinal section, which comprises an upper sloped wall region (1U), a lower sloped wall region (1D) and a forward curved wall region (1F). It is essential that those wall regions (1U, 1D, 1F) should have a certain thickness sufficient to provide a certain rigidity to support a lower body portion of a seat occupant and withstand keen contact of the child seat (C) therewith as well as a load applied from the child seat (C) locked to the shape-retaining/lock element (RS).

The breadth or width-wise length of the main hollow body portion (1M) is substantially the same as the width-wise length of the space (L) or a distance between the two brackets (S).

The hollow support body (1) has a first backward end portion (1E-a) firmly secured to the back board (B) and a second backward end portion (1E-b) firmly secured to the frame member (32), whereby the hollow support body (1) or shape-retaining/locking element (RS) is fixedly retained against movement in the space (L) under the armrest (AR).

The illustrated cut-away portion (A) is defined in the right-side corner of the main hollow body portion (1M) of the hollow support body (1) and designed to allow insertion therein of a corresponding one of the two engagement notch portions (43) (43) of child seat (C). Specifically, this cut-away portion (1A) is defined by forming a first vertical wall (10) and second vertical wall (10B) in the corresponding corner area of the support body (1), wherein the first vertical wall (10) faces to the forward side (F) and the second vertical wall (10B) faces to the right side of the support body (1) or the seat, as viewed from FIGS. 1 and 5.

As can be seen from FIG. 5, an elongated through-hole (10A) is so formed in the first vertical wall (10) as to extend in a direction transversely of the latter.

As stated earlier, the engagement wire element (3) is formed under ISO standard and of a generally "U" shape which includes a horizontal wire portion (30). This wire element (3) constitutes a female lock element with which the foregoing hook-like latch piece (42), as a male lock element, is to be latchingly engaged.

The two ends of the engagement wire element (3) are firmly secured to and supported by a support bracket (32A) fixed to the inner wall of the frame member (32), while on the other hand, the generally U-shaped forward portion (at 30) thereof extends through the afore-said through-hole (10A) and projects outwardly from the first vertical wall (10). As shown, the generally U-shaped forward portion, including the horizontal wire portion (30), of the engagement wire element (3) is exposed within the cut-away portion (1A).

Designation (10C) denotes a downward recession formed in the upper wall (1U) of the hollow support body (1) at a point adjacent to the first backward end portion (1E-a) of that support body (1), which is a rearmost point in the space (L). This downward recession (10C) is a female securing point in where is engaged and fixed a hook-like securing piece (24) of shape-retaining cover member (2) as will be elaborated later.

Designation (10E) denotes an upward recession formed in the lower wall (1D) of the hollow support body (1) at a point corresponding to the cut-away portion (1A). This upward recession (10E) is a point where a part of a velcro faster element (hook and loop faster) designated by (MT) is provided in association with the shape-retaining cover member (2) as will be elaborated later. In this respect, it is to be understood that this particular upward recession (10E) is disposed on the right side of the hollow support body (1), and further, while not shown, another upward recession identical thereto is formed in the lower wall region (1D) on the left side of the hollow support body (1).

The illustrated shape-retaining cover member (2) is of a two-layer lamination structure comprising: a shape retaining layer (21); and an elastic foam wadding layer (22). This shape-retaining cover member (2) per se is formed to have a curved shape shown in FIGS. 4, 6 and 7, which substantially conforms to the curved configuration of main hollow body portion (1M). Further, the shape retaining-layer (21) is formed from a relatively hard synthetic resin material having a certain elasticity, such that it normally tends to retain such original curved shape due to its inherent rigidity and resilient recovery force, but may be manually bent and warped reversely (see FIGS. 5 and 7) by giving thereto a force exceeding that resilient recovery force. Of course, such reversely bent or warped shape retaining layer (21) will naturally and automatically return to its original curved shape due to its recovery property, when it is released, as will be described later.

It is noted here that a top cover layer may be juxtaposed on the foam wadding layer (22) to provide a three-layer lamination structure of the shape-retaining cover member (2) with a view to improving the outer aesthetic appearance of the shape-retaining/locking element (RS).

An entire size of the foregoing shape-retaining cover member (2) is substantially equal to an entire forwardly facing surface area of the main hollow body portion (1M) which is an entire surface area obtained by total surface areas of the upper and lower sloped wall regions (1U) (1D) and the forward curved wall region (1F)) as well as an extended local surface area of those three wall regions which compensates for the cut-away portion (1A).

As seen in FIGS. 6 and 7, a securing hook member (24) is fixed as by sewing to one end (2A) of the shape-retaining cover member (2) so as to be situated on the shape retaining layer (21).

In this context, a pair of velcro faster elements (MT) are provided between another end (2B) of the shape-retaining cover member (2) and the afore-said upward recession (10E).

Specifically, as is known, each of the velcro faster elements (MT) comprises a first faster part (11) and a second faster part (23), which are releasably engaged with each other, wherein one of the first and second faster parts (11) (23) may be a female engagement part (i.e a loop engagement part) and another of them be 8 male engagement part (i.e. a hook engagement part).

As seen in FIGS. 6 and 7, the second fastener part (23) is fixed as by sewing to another end (2B) of the trim cover member (2) so as to be situated on the shape retaining layer (21), whereas on the other hand, the first fastener part (11) is fixedly attached to the afore-said upward recession (10E).

As understandable from FIGS. 4 and 6, normally, the shape-retaining cover member (2) positively covers most of the above-mentioned forwardly facing surface area of the main hollow body portion (1M) in a close contact thereupon, because the former (2) retains its curved shape that generally conforms to the above-mentioned curved wall regions of the latter (1) as previously described. Namely, the upper sloped wall region (1U), forward cured wall region (1F), and lower sloped wall region (1D) are all covered with the shape-retaining cover member (2) in conformity therewith, while further, that shape-retaining cover member (2) provides a curved cover of generally "U" shape in longitudinal section over the cut-away portion (1A), as shown in FIG. 6.

In this regard, as also best seen in the FIG. 6, one end portion (at 2A) of the shape-retaining cover element (2) passes through a clearance between the lower end (AR-1) of the armrest (AR) and the upper sloped wall region (1U), and the securing hook member (24) fixed to one end (2A) of the cover element (2) is securely connected in the downward recession (10C). On the other hand, another end portion (at 2B) of the shape-retaining cover element (2) extends under the cut-away portion (1A) and through a small space defined between the upward recession (10E) and the upper surfaces of seat cushion (SC), and the second fastener part (23) fixed to another end (2B) of the cover element (2) is securely engaged with the first fastener part (11). Thus, the shape-retaining cover member (2) is removably secured to the hollow support body (1) and covers an entire forwardly facing surface area of the shape-retaining/locking element (RS). Particularly, the shape-retaining cover member (2) overlies and conceals the cut-away portion (1A) and engagement wire element (3), thereby providing a uniform curved surface to the entire forwardly facing surface of hollow support body (1). Accordingly, a uniform rigid curved surface of the shape-retaining/locking element (RS) is retained and filled in the space (L) which effectively provides a rigidity surface or wall sufficient to support a lower body portion of a seat occupant when the armrest is set at the storage position as in FIGS. 1 and 2, and withstand keen contact of the child seat (C) therewith as well as a load applied from the child seat (C) locked to the shape-retaining/ lock element (RS).

As can be seen in FIGS. 5 and 7, when it is desired to attach the child seat (C) to the center back portion (CTR), a user inserts his or her hands into the cut-away portion (1A) and further into a space between the upward recession (11) and seat cushion (SC) and then withdraw the second end (2B) of shape-retaining cover member (2) therefrom by forcibly disengaging two second velcro fastener parts (23) from the respective two first velcro fastener parts (11). Then, the user easily takes out the second end (2B) to the outside of support body (1) and bend or warp the shape-retaining cover member (2) upwardly, as shown in FIG. 7, with a force overcoming the above-discussed recovery force of the shape retaining layer (21) in that cover member (2), so that both cut-away portion (1A) and engagement wire element (3) are exposed outwardly as best shown in FIG. 5.

With the cover member (2) being warped upwardly as such, as shown in FIGS. 2 and 3, one of the two engagement notch portions (43) (43) of child seat (C) is inserted far into the cut-away portion (1A) until the hook-like latch piece (42) is engaged over the horizontal wire portion (30) of the engagement wire element (3).

In this respect, as indicated by the designation (30A) in FIG. 1, another lock point is provided in the lower end region of the right-side seat back (SB) in view of the face that a width-wise length of the hollow support body (1) of shape-retaining/locking element (RS) is smaller than a distance between the two engagement notch portions (43) of child seat (C) as well as than a distance between the two hook-like latch pieces (42). As such, while not shown, another engagement wire element identical to the engagement wire element (3) is fixedly provided in that lock point (30A). Therefore, simultaneous with the foregoing insertion of one engagement notch portion (43) of child seat (C), another engagement notch portion (43) of the child seat (C) is also inserted into the lock point (30A) until another hook-like latch piece (42) is engaged over a horizontal wire portion (at 30) of another unshown engagement wire element.

Accordingly, the child seat (C) is locked to the center back portion (CTR) as shown in FIG. 3.

If it is desired to remove the child seat (C) from the center back potion (CTR), the user may effect a required unlocking operation to cause disengagement of both two hook-like latch pieces (42) from the respective engagement wire elements (3) and withdraw both two engagement notch portions (43) from the cut-away portion (1A) and another lock point (30A), respectively. Then, after having removed the child seat (C) in that way, the reversely curved shape-retaining cover member (2) naturally and automatically recovers and assumes the normal curved shape shown in FIG. 6 due to its inherent recovery property as previously stated, and therefore, the user easily inserts the second end (2B) of the cover member (2) into a small space between the lower sloped wall region (1D) and the seat cushion (SC) and then securely engage the second fastener part (23) with the first fastener part (11) as in the FIG. 6. Thus, the outer surfaces of support body (1) as well as the cut-away portion (1A) are covered with the shape-retaining cover member (2).

Designations (34A) (34A) in FIG. 1 respectively stand for a pair or another locking points provided in the lower end region of right-side seat back. Also, designations (33A) (33A) respectively stand for a pair of still another locking points provided in the lower end region of left-side seat back. Such lock arrangements are known in the art, and no further description is omitted thereon. A user can insert the foregoing two engagement notch portions (43) and two hook-like latch pieces (42) into either the two respective locking points (34A) or another two locking points (33A), respectively, if he or she wishes to mount and lock the child seat (C) to one of the two seat backs (SB).

While having described the present invention so far, it should be understood the invention is not limited to the illustrated embodiment, but any modification, replacement and addition may be applied thereto without departing the scopes of the appended claims.

What is claimed is:

1. An automotive seat of a type which allows a child seat to be mounted thereon and has a pair of seat backs, a center back portion defined between said pair of seat backs, and a seat cushion, wherein said center back portion has a lower region adjacent to said seat cushion and said child seat includes a male lock means, said automotive seat comprising:
   a shape retaining/locking element provided to said lower region of said center back portion, said shape-retaining/locking element comprising;
   a hollow support body formed from a rigid material, said hollow support body having: a forwardly facing surface portion which faces to a forward side of said automotive seat; a lower region facing to said seat cushion; and an upper region opposite to said lower region;
   a cut-away portion defined in a local part of said forwardly facing surface portion of said hollow support body;
   a female engagement means fixedly provided in said hollow support body, such that a part thereof is exposed outwardly in said cut-away portion, wherein said part of said female engagement means is so adapted that said male lock means of said child seat is engageable therewith for locking said child seat to said center back portion; and
   a cover means for covering said forwardly facing surface portion of said hollow support body and said cut-away portion, said cover means comprising at least two cover layers, wherein one of said at least two cover layers is formed from a relatively hard synthetic resin material with a certain elasticity so as to normally tend to retain an original shape due to a resilient recovery force thereof, while being bendable with a force overcoming said resilient recovery force, wherein said original shape is a shape generally conforming to said forwardly facing surface portion of said hollow support body,
   wherein said cover means is securely connected at one end thereof with said upper region of said hollow support body and is releasably connected at another end thereof with said lower region of the hollow support body, such that said one of said at least two cover layers is in contact with and along said forwardly facing surface portion of said hollow support body, while extending over said cut-away portion.

2. The automotive seat as claimed in claim 1, wherein said forwardly facing surface portion of said hollow support body comprises a forward wall region facing to said forward side, a lower wall region facing to said seat cushion, and an upper wall region opposite to said lower wall region, wherein said hollow support body further comprises a backward side facing to a backward side of said automotive seat, said backward side being fixed to said lower region of said center back portion, wherein said cut-away portion is defined by cutting away a local region of each of said forward wall region, lower wall region and upper wall region, and wherein said upper region is defined in said upper wall region at a point adjacent to said backward side, whereas said lower region is defined in said lower wall region at a point corresponding to and adjacent to said cut-away portion.

3. The automotive seat according to claim 2, wherein said cut-away portion includes a vertical wall facing to said forward side, and wherein said part of said female engagement means projects outwardly from said vertical wall and is exposed in said cut-away portion.

4. The automotive seat as claimed in claim 1, wherein said female engagement means comprises an engagement wire element having a horizontal wire portion which corresponds to said part of said female engagement means, and wherein said horizontal wire portion is exposed outwardly in said cut-away portion.

5. The automotive seat as claimed in claim 1, wherein there is provided a fastener means comprising a male fastener part and a female fastener part, which are engageable with and disengageable from each other, and wherein one of said male and female parts is fixed to said another end of said cover means, while another of said male and female parts is fixed to said lower region of said hollow support body, so that said another end of said cover means is releasably connected with said lower region of the hollow support body.

6. The automotive seat as claimed in claim 1, wherein said one of said at least two cover layers is a layer formed from polypropylene, and wherein another of said at least two cover layers is an elastic layer.

7. The automotive seat as claimed in claim 1, wherein said one end of said cover means is provided with a hook engagement means, wherein a recession is formed in said upper region of said hollow support body, and wherein, by securely engaging said hook engagement means in said recession, said one end of the cover means is securely connected to said upper region of said hollow support body.

8. The automotive seat as claimed in claim 1, wherein said forwardly facing surface portion of said hollow support body is of a generally "U" shape in longitudinal section, which comprises a lower wall region facing to said seat cushion, an upper wall region opposite to said lower wall region, a forward curved wall region defined between said lower and upper wall regions, said forward curved wall region facing to said forward side, and wherein said one of said at least two cover layers is formed in a curved shape that generally conforms to said generally "U" shape of said hollow support body and has a resilient recovery force that normally tends to retain said curved shape and thus cover said lower and upper wall regions as well as said forward curved wall region in conformity therewith, while being bendable reversely away therefrom with a force overcoming said resilient recovery force.

9. The automotive seat as claimed in claim 8, wherein said lower wall region is sloped upwardly away from said seat cushion as the lower wall region proceeds to said forward curved wall region.

10. An automotive seat of a type which allows a child seat to be mounted thereon and has a pair of seat backs, a center back portion defined between said pair of seat backs, a seat cushion, and an armrest, wherein said armrest is rotatably connected to said center back portion, with a space given between the armrest and said seat cushion, wherein said center back portion has a lower region at a point corresponding to said space, and wherein said child seat includes a male lock means, said automotive seat comprising;
- a shape retaining/locking element provided in said space, said shape-retaining/locking element comprising;
- a hollow support body formed from a rigid material, said hollow support body having: a forwardly facing surface portion which faces to a forward side of said automotive seat; a lower region facing to said seat cushion; and an upper region opposite to said lower region;
- a cut-away portion defined in a local part of said forwardly facing surface portion of said hollow support body;
- a female engagement means fixedly provided in said hollow support body, such that a part thereof is exposed outwardly in said cut-away portion, wherein said part of said female engagement means is so adapted that said male lock means of said child seat is engageable therewith for locking said child seat to said center back portion; and
- a cover means for covering said forwardly facing surface portion of said hollow support body and said cut-away portion, said cover means comprising at least two cover layers, wherein one of said at least two cover layers is formed from a relatively hard synthetic resin material with a certain elasticity so as to normally tend to retain an original shape due to a resilient recovery force thereof, while being bendable with a force overcoming said resilient recovery force, wherein said original shape is a shape generally conforming to said forwardly facing surface portion of said hollow support body, wherein said cover means is securely connected at one end thereof with said upper region of said hollow support body and is releasably connected at another end thereof with said lower region of the hollow support body, such that said one of said at least two cover layers is in contact with and along said forwardly facing surface portion of said hollow support body, while extending over said cut-away portion.

11. The automotive seat according to claim 10, wherein said one of said at least two cover layers is a layer formed from polypropylene, and wherein another of said at least two cover layers is an elastic layer.

12. The automotive seat as claimed in claim 10, wherein said forwardly facing surface portion of said hollow support body is of a generally "U" shape in longitudinal section, which comprises: a lower wall region facing to said seat cushion; an upper wall region opposite to said lower wall region, said upper wall region facing to said armrest; a forward curved wall region defined between said lower and upper wall regions, said forward curved wall region facing to said forward side, and wherein said one of said at least two cover layers is formed in a curved shape that generally conforms to said generally "U" shape of said hollow support body and has a resilient recovery force that normally tends to retain said curved shape and thus cover said lower and upper wall regions as well as said forward curved wall region in conformity therewith, while being bendable reversely away therefrom with a force overcoming said resilient recovery force.

13. The automotive seat according to claim 12, wherein said lower wall region is sloped upwardly away from said seat cushion as the lower wall region proceeds to said forward curved wall region, whereas said upper wall region is sloped downwardly away from said armrest as the upper wall region proceeds to said forward curved wall region.

* * * * *